United States Patent [19]

Belenkiy et al.

[11] Patent Number: 5,245,683
[45] Date of Patent: Sep. 14, 1993

[54] BOARD MOUNTED FIBER OPTIC CONNECTOR

[75] Inventors: Yuriy Belenkiy, Chicago; Igor Grois, Northbrook; Ilya Makhlin, Skokie, all of Ill.

[73] Assignee: Molex Incorporated, Wellington, Ill.

[21] Appl. No.: 934,135

[22] Filed: Aug. 21, 1992

[51] Int. Cl.⁵ .................................. G02B 6/38
[52] U.S. Cl. ............................. 385/72; 385/69; 385/86
[58] Field of Search ............ 385/60, 72, 78, 69, 385/86

[56] References Cited

U.S. PATENT DOCUMENTS

| | | | |
|---|---|---|---|
| 4,406,514 | 9/1983 | Hillegonds et al. | 350/96.21 |
| 4,470,660 | 9/1984 | Hillegonds et al. | 350/96.21 |
| 4,597,631 | 7/1986 | Flores | 350/96.20 |
| 5,073,042 | 12/1991 | Mulholland et al. | 385/86 X |
| 5,082,344 | 1/1992 | Mulholland et al. | 385/60 |
| 5,101,463 | 3/1992 | Cubukciyan et al. | 385/72 |

Primary Examiner—John D. Lee
Assistant Examiner—Phan T. Heartney
Attorney, Agent, or Firm—A. A. Tirva

[57] ABSTRACT

An optical fiber connector assembly is disclosed for mating the end of an optical fiber with a fiber of a second optical connector element. A cylindrical ferrule is adapted to be secured around the optical fiber. A ferrule holder is adapted to be secured about the ferrule. A housing is adapted for receiving the ferrule holder, the housing having a rear open end into which the ferrule holder can be assembled. A spring within the housing biases the ferrule holder forwardly. The housing is adapted for relative permanent mounting to a substructure such as a printed circuit board. A retainer clip is insertable through an opening in the housing from the exterior thereof against a rear portion of the spring to retain the spring within the housing in loaded condition biasing the ferrule holder forwardly in the housing. The retainer clip can be readily removed to allow the ferrule holder to be disassembled from the housing through the rear open end thereof without unmounting the housing from the substructure. A spring loaded, retractable shroud is provided at the front end of the housing for surrounding and protecting the projecting end of the optical fiber, the shroud being retractable automatically relative to the housing upon mating of the connector assembly with the adaptor.

14 Claims, 3 Drawing Sheets

BOARD MOUNTED FIBER OPTIC CONNECTOR

FIELD OF THE INVENTION

This invention generally relates to the art of electrical connectors and, particularly, to a fiber optic connector system for optical fibers.

BACKGROUND OF THE INVENTION

In the optical fiber art, lightguide fibers are used in optical transmission systems wherein the fibers are connected end-to-end to transfer light therebetween. The fibers usually are terminated in connectors which center the fibers to provide low insertion losses. The connectors are coupled together so that their encapsulated fibers connect end-to-end.

Optical fiber connectors often include a connector body secured about a forwardly projecting ferrule of ceramic or other rigid material, and a connecting member for coupling the connector to a complementary connector or other optical connector element. In some applications, the connecting member may be a coupling ring, or the like, surrounding a housing for coupling the connector to the complementary connector element. In other applications, the housing itself may comprise the connector member, such as inserting the housing into an adaptor between a pair of mating connector housings. The fiber projects slightly from the distal end of the ferrule for end-to-end connection to a projecting fiber of the complementary optical connector element.

One of the problems in the art of fiber optic connector assemblies is that they are difficult and/or expensive to manufacture, difficult to assemble and they do not lend themselves to ready disassembly. For instance, it may be desirable to be able to disassemble a fiber optic connector to replace or repair the interior assembly comprised of the connector body, ferrule and its projecting fiber.

One such application is where a fiber optic connector is mounted to a printed circuit board in a blind mating connector apparatus. Heretofore, in order to replace any interior components of the fiber optic connector, the entire connector had to be removed from the printed circuit board if such was even possible. However, it would be desirable to permanently mount the connector to the board so that the connector moves with the board as a unit. Such permanent connections do not lend themselves to ready replacement or repair of interior components of the connector.

This invention is directed to solving such problems by providing a fiber optic connector assembly which can be permanently mounted on a substructure, such as a printed circuit board, and wherein the interior components of the connector, such as the connector body, ferrule and its projecting fiber, can be readily removed and replaced without removing the entire connector from the printed circuit board.

SUMMARY OF THE INVENTION

An object, therefore, of the invention is to provide a new and improved fiber optic connector system, and particularly a system wherein interior components of the connector can be readily removed or replaced.

The invention is disclosed in a connector assembly for mating the end of an optical fiber with a fiber of a second optical connector element, such as a complementary connector. The connector assembly includes a cylindrical ferrule adapted to be secured around the optical fiber. A connector body in the form of a ferrule holder is adapted to be secured about the cylindrical ferrule. The ferrule holder has a flange located a predetermined distance from a rear end of the holder. A housing is adapted for receiving the ferrule holder and has rearwardly facing shoulder means against which the flange of the ferrule holder can abut. The housing has a rear open end into which the ferrule holder can be assembled into the housing. A spring is located within the housing for engaging the flange of the ferrule holder to bias the ferrule holder forwardly against the shoulder means of the housing.

The invention contemplates that the housing be provided with mounting means for mounting the housing on a substructure such as a printed circuit board. Spring retaining means are insertable through an opening in the housing, from the exterior thereof, against a rear portion of the spring means to retain the spring means within the housing in loaded condition biasing the ferrule holder forwardly in the housing. The spring retaining means can be readily removed to allow the ferrule holder to be disassembled from the housing through the rear open end thereof without unmounting the housing from the printed circuit board.

In the exemplary embodiment of the invention, the spring is provided in the form of a coil spring surrounding the ferrule holder behind the flange thereof. A forward end of the coil spring is engageable with the flange of the ferrule holder, and a rear end of the coil spring is engageable by the spring retaining means. The spring retaining means is provided in the form of a U-shaped clip having a pair of leg portions insertable into the housing and a bight portion exposed exteriorly of the housing to facilitate removal of the clip. A washer element may be sandwiched between the rear end of the coil spring and the leg-portions of the U-shaped clip.

In some structures, the ferrule of the connector and its projecting fiber extend beyond a forward end of the connector housing. The invention contemplates a feature of providing a spring-loaded shroud which surrounds the protruding end of the ferrule and the projecting fiber. When mated, the spring loaded shroud retracts within the connector housing.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like element in the figures and in which:

DETAILED DESCRIPTION OF THE PREFERRED EMBODIMENT

Figure 1:
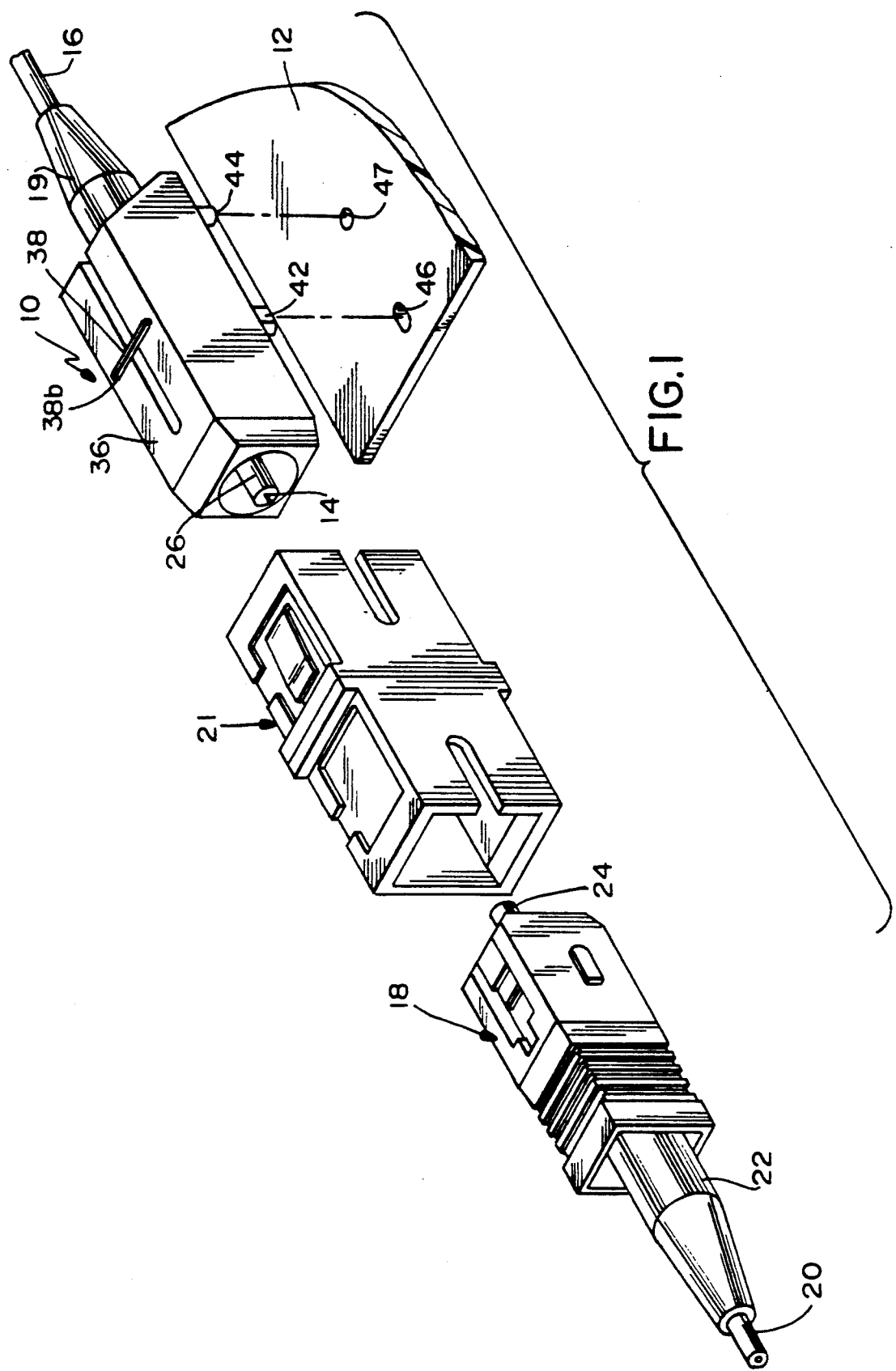
FIG. 1 is an exploded perspective view of a fiber optic connector system employing the connector assembly of the invention.

Referring to the drawings in greater detail, and first to FIG. 1, the invention is embodied in a connector assembly, generally designated 10, for mounting on a printed circuit board 12. The connector assembly is shown in an application for mating an end of an optical fiber 14 of a conventional fiber optic cable 16 to an optical fiber of a second optical connector element, such as a complementary fiber optic connector assembly, generally designated 18. The fiber optic cable is conventional and may include a strain-relief boot 19. Connector assembly 18 terminates a second fiber optic cable 20, including a strain relief boot 22, and the connector includes a forwardly protruding ferrule 24 beyond which the end of an optical fiber projects. Connector assemblies 10 and 18 are coupled end-to-end in an adaptor 21 which may be mounted on a backplane of an electronic apparatus (not shown) to thereby connect the ends of the optical fibers of cables 16 and 20 at an end-to-end interconnection.

It should be understood that the fiber optic connector system shown in FIG. 1 is but one application of the invention. Second optical connector element or complementary connector assembly 18, along with adaptor 21 are fairly conventional components. The invention resides in a "quick disassembly" system incorporated in connector assembly 10, as described below.

Figure 2:
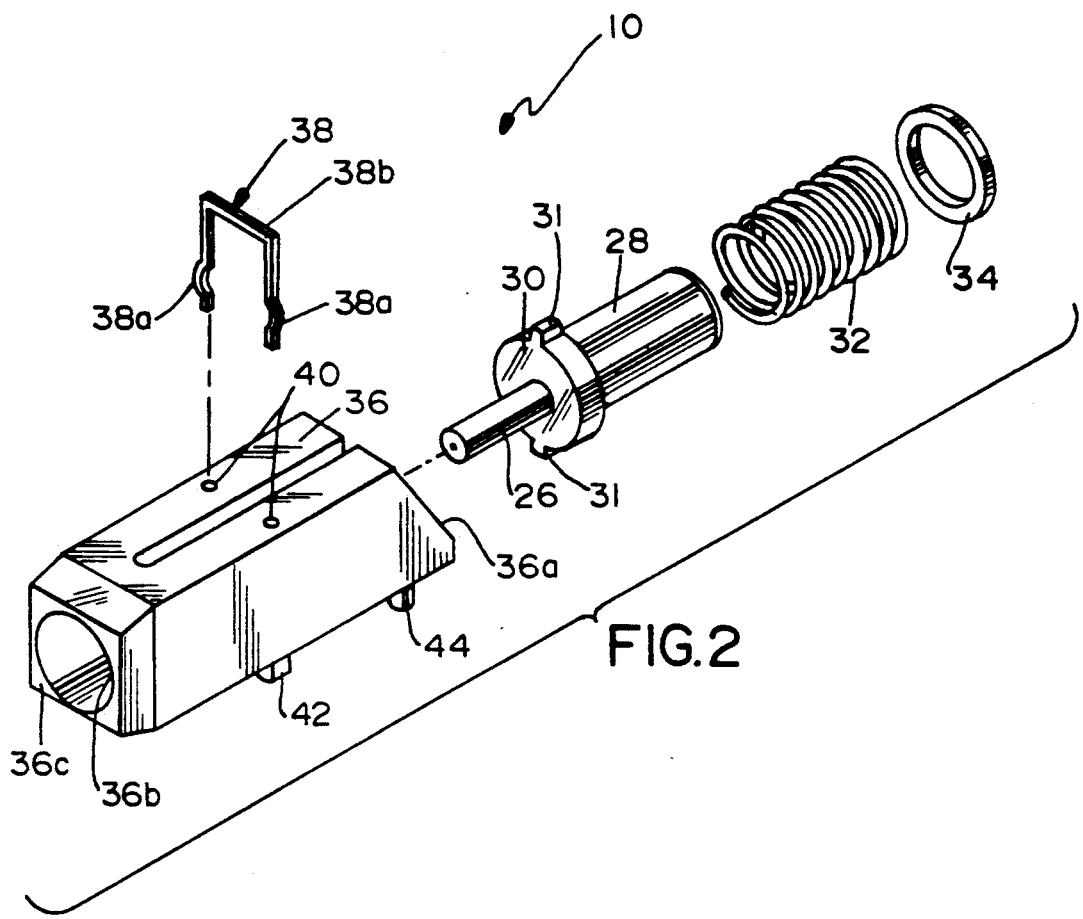
FIG. 2 is an exploded perspective view of the connector assembly of the invention.

More particularly, referring to FIG. 2, connector assembly 10 is shown in an exploded depiction without fiber optic cable 16. The assembly includes a cylindrical ferrule 26 of ceramic or other rigid material. The ferrule is adapted to be secured around the optical fiber of the fiber optic cable, whereby an end of the fiber projects beyond the end of the ferrule. A ferrule holder 28 is adapted to be secured about ferrule 26. As is conventional, fiber optic cable 16 includes an outer cladding which is removed or stripped from the optical fiber within ferrule holder 28. The ferrule holder has an outwardly protruding peripheral flange 30 at its forward end. Two projections 31 extend from the outer periphery adapted to engage keyways 33 in the housing to provide predetermined orientation of the fiber should the end of the fiber be polished at an angle. A coil spring 32 is sized for surrounding ferrule holder 28, and a washer element 34 also is sized for surrounding the ferrule holder, whereby, in assembled condition, the forward end of the coil spring is sandwiched between flange 30 and washer element 34.

Still referring to FIG. 2, connector assembly 10 includes a housing 36 adapted for receiving ferrule holder 28, coil spring 32 and washer element 34 into an open rear end 36a of the housing. The housing has an opening 36b in a forward mating face 36c thereof, whereby ferrule 26 and its projecting fiber end protrudes forwardly of the mating face. For purposes to be described in greater detail, assembly 10 further includes a spring retaining means, generally designated 38, insertable through a pair of openings 40 in housing 36 from the exterior thereof to hold ferrule holder 28, coil spring 32 and washer element 34 within the housing and to permit ready disassembly of those components from the housing. Suffice it to say, spring retaining means 38 is generally U-shaped as seen best in FIG. 2, including a pair of leg portions 38a and a bight portion 38b. The leg portions are insertable through openings 40 in the housing, and the bight portion rests on top of the housing for easy grasping by a user, as seen in FIG. 1. Each of the leg portions 38a may include a bent section 38c for engaging a recess (not shown) in each of the openings 40 to make the spring retention means vibration resistant.

Figure 3:
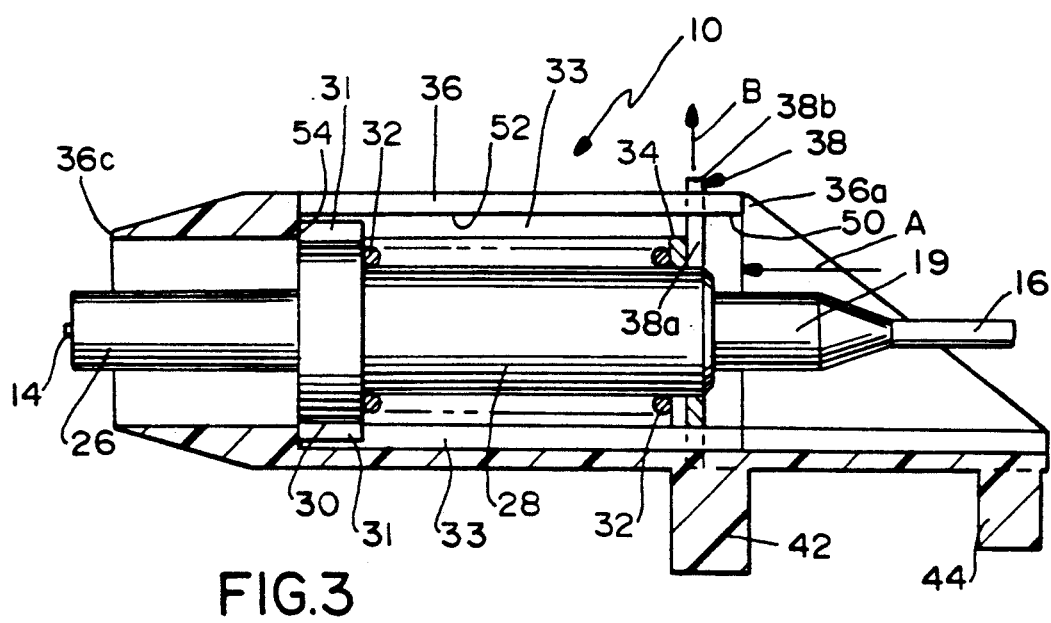
FIG. 3 is an axial section through the connector assembly of FIG. 2, in assembled condition.

Referring to all of FIGS. 1-3, housing 36 is unitarily molded of plastic or like material and includes front and rear pegs 42 and 44, respectively, depending from the underside of the housing. Front peg 42 is inserted into a hole 46 and rear peg 44 into a hole 47 (FIG. 1) in printed circuit board 12 for permanently mounting the connector assembly, particularly housing 36, to the printed circuit board.

Referring to FIG. 3, connector assembly 10 is shown in assembled condition. This depiction shows that rear end 36a of housing 36 is open, as at 50. Therefore, ferrule holder 28 (along with ferrule 26), coil spring 32 and washer element 34 are assembled into an interior cavity 52 of the housing, through the open rear end of the housing in the direction of arrow "A". A shoulder means 54 is molded integrally with housing 36 within cavity 52. The shoulder means faces rearwardly, and flange 30 of ferrule holder 28 abuts against the shoulder means in fully assembled condition.

In assembly, as seen in FIG. 3, spring retaining means 38 is effective to maintain the coil spring 32 in loaded condition to bias ferrule holder 28 forwardly with flange 30 in abutment with shoulder means 54 of the housing. Specifically, legs 38a of the U-shaped spring retaining means bear against the rear side of washer element 34 which, in turn, bears against the rear end of the coil spring. It can be seen that the diameter of the washer element is larger than the outside diameter of the coil spring. It also can be seen that ferrule 26 protrudes beyond mating face 36c of housing 36 and the end of optical fiber 14 projects beyond the ferrule for end-to-end connection with the fiber end of a complementary mating connector. Lastly, it can be seen that bight portion 38b of spring retaining means 38 is exposed exteriorly of housing 36, i.e., at the top thereof, for ready grasping by a user.

When it is desired to disassemble connector assembly 10, a user simply grasps on bight portion 38b of spring retaining means 38 and pulls upwardly on the retaining means in the direction of arrow "B" (FIG. 3). Washer element 34, coil spring 36 and ferrule holder 28 (along with ferrule 26) then are easily disassembled from housing 38 through the open rear end 50 thereof. The housing does not have to be removed from its permanent mounting on printed circuit board 12.

Figure 4:
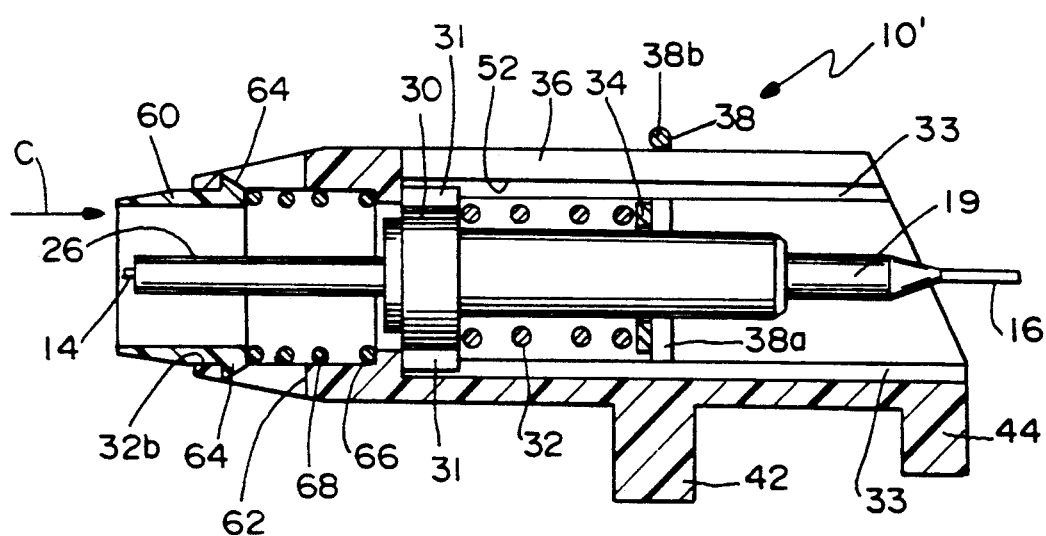
FIG. 4 is an axial section similar to that of FIG. 3, but incorporating a modified embodiment having a spring

FIG. 4 shows an alternate embodiment of the invention incorporating a protective shroud 60 at the forward end of the connector assembly which is designated generally as 10' in this figure. Otherwise, like reference numerals have been applied to the structural components of connector assembly 10' as have been applied to like components described above in relation to connector assembly 10.

More particularly, in connector assembly 10', housing 36 has a pair of openings 62 into which hook portions 64 of protective shroud 60 are snap-fit. It can be seen that the rear surfaces of the hook portions are chamfered or inclined so that the shroud can be inserted into forward opening 36b of the housing. The housing is provided with an interior, forwardly facing shoulder means 66. A coil spring 68 is located within the forward area or nose of the housing and is sandwiched under loaded condition between shoulder means 68 and the rear of protective shroud 60, as seen in FIG. 4. It also can be seen that the shroud projects forwardly of housing 36 beyond the forward end of ferrule 26 and the projecting end of optical fiber 14. Therefore, during assembly, handling, shipping or mounting the connector assembly to a printed circuit board, the projecting end of the optical fiber is protected against striking or abutting by an extraneous object, keeping in mind that the projecting fiber end is polished and very delicate.

When connector assembly 10' is mated to a complementary connector component, protective shroud 60 simply retracts in the direction of arrow "C", upon engagement with a mating face of the adaptor, compressing coil spring 68, whereupon the projecting end of optical fiber 14 can be exposed for end-to-end connection with a fiber end of a complementary mating connector.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In a connector assembly for mating the end of an optical fiber with a fiber of a second optical connector element, including a cylindrical ferrule adapted to be secured around the optical fiber, a ferrule holder adapted to be secured about the cylindrical ferrule, the ferrule holder having a flange located a distance from a rear end of the holder, a housing adapted for receiving the ferrule holder and having forward shoulder means against which the flange of the ferrule holder can abut and a rear open end into which the ferrule holder can be assembled into the housing, and a spring means within the housing for engaging the flange of the ferrule holder and biasing the ferrule holder forwardly against the shoulder means of the housing, wherein the improvement comprises said housing having mounting means for mounting the housing on a substructure such as a printed circuit board, and spring retaining means insertable and removable through an opening in the housing from the exterior thereof against a rear portion of the spring means to retain the spring means within the housing in loaded condition biasing the ferrule holder forwardly in the housing, whereby the spring retaining means can be readily removed to allow the ferrule holder to be disassembled from the housing through the rear open end thereof without unmounting the housing from the printed circuit board.

2. In a connector assembly as set forth in claim 1, wherein said spring means surrounds the ferrule holder behind the flange thereof.

3. In a connector assembly as set forth in claim 2, wherein said spring means comprises a coil spring having a forward end engageable with the flange of the ferrule holder and a rear end effectively engageable by said spring retaining means.

4. In a connector assembly as set forth in claim 3, wherein said spring retaining means comprises a U-shaped clip having a pair of leg portions insertable into the housing and a bight portion exposed exteriorly of the housing to facilitate removal of the clip.

5. In a connector assembly as set forth in claim 4, including a washer element sandwiched between the rear end of the coil spring and the leg-portions of the U-shaped clip.

6. In a connector assembly as set forth in claim 5, wherein said washer element is sized to surround a rear portion of the ferrule holder.

7. In a connector assembly as set forth in claim 2, wherein said spring retaining means comprises a U-shaped clip having a pair of leg portions insertable into the housing each leg having a bent section for engaging a recess within the housing and a bight portion exposed exteriorly of the housing to facilitate removal of the clip.

8. In a connector assembly as set forth in claim 1, wherein said spring retaining means includes at least one portion extending into the housing and another portion exposed exteriorly of the housing to facilitate removal of the retaining means.

9. In a connector assembly as set forth in claim 1, wherein said housing includes at least one keyway extending along the longitudinal axis of the housing and wherein said flange includes at least one projection extending from its outer periphery for engaging said keyway and thereby orienting the optical fiber in a predetermined position.

10. A fiber optic connector assembly for mating the end of an optical fiber with a fiber of a second optical connector element, comprising:
 a ferrule adapted to be secured around the optical fiber such that the end of the optical fiber projects from a forward end of the ferrule;
 a ferrule holder adapted to be secured about the ferrule such that a forward end of the ferrule protrudes beyond the ferrule holder, the ferrule holder having a flange located a distance from a rear end of the holder;
 a housing adapted for receiving the ferrule holder and having forward shoulder means against which the flange of the ferrule holder can abut, a rear open end into which the ferrule holder can be assembled, and mounting means for mounting the housing on a substrate;
 spring means within the housing for biasing the ferrule holder forwardly within the housing; and
 spring retaining means insertable and removable through an opening in the housing from the exterior thereof against a rear portion of the spring means to retain the spring means within the housing in loaded condition biasing the ferrule holder forwardly in the housing,
 whereby the spring retaining means can be readily removed to allow the ferrule holder to be disassembled from the housing through the rear open end thereof without unmounting the housing from the substrate.

11. The fiber optic connector assembly of claim 10 wherein said spring means comprises a coil spring surrounding the ferrule holder and having a forward end engageable with the flange of the ferrule holder and a rear end effectively engageable by the spring retaining means.

12. The fiber optic connector assembly of claim 11, including a washer element sandwiched between the rear end of the coil spring and the spring retaining means.

13. The fiber optic connector system of claim 10 wherein said spring retaining means include at least one portion extending into the housing and another portion exposed exteriorly of the housing to facilitate removal of the retaining means.

14. In a connector assembly for mating the end of an optical fiber with a fiber of a second optical connector element, including a ferrule adapted to be secured around the optical fiber such that an end of the fiber projects beyond a forward end of the ferrule, a ferrule holder adapted to be secured about the ferrule such that the ferrule protrudes beyond a forward end of the ferrule holder, and a housing adapted for receiving the ferrule holder and having a forward mating face beyond which at least the projecting end of the optical fiber is exposed, wherein the improvement comprises a protective shroud movably mounted on the forward end of the housing and protruding therefrom a distance at least sufficient to surround and protect the exposed end of the optical fiber, and spring means operatively associated between the housing and the protective shroud for spring loading the protective shroud, whereby the protective shroud can automatically retract relative to the housing to expose the projecting end of the optical fiber upon mating of the connector assembly with the second optical connector element.

* * * * *